United States Patent

Erben et al.

[15] 3,691,539

[45] Sept. 12, 1972

[54] SUPERCONDUCTIVE DEVICE FOR ELECTRONIC STORAGE OF LARGE QUANTITIES OF DATA USING MAGNETIC PARTICLES

[72] Inventors: Klaus Dieter Erben; Walter Kroy; Sigmund Manhart, all of Munich; Walter E. Mehnert, Ottobrunn, all of Germany

[73] Assignee: Messerschmitt-Bolkow-Blohm GmbH, Munich, Germany

[22] Filed: April 20, 1970

[21] Appl. No.: 29,827

[30] Foreign Application Priority Data

April 28, 1969 Germany..........P 19 21 700.6

[52] U.S. Cl.................................340/173.1, 307/306

[51] Int. Cl..............................................G11c 11/44

[58] Field of Search...................................340/173.1

[56] References Cited

UNITED STATES PATENTS 3,309,680 3/1967 Pritchard................340/173.1

*Primary Examiner*—Terrell W. Fears

*Attorney*—Woodhams, Blanchard and Flynn

[57] ABSTRACT

Data storage device particularly for large quantities of data for program or film storage systems. The device contemplates a three layered storage element comprising a substrate which is superconductive at the operating temperature of the device, and insulating film applied thereto and an upper layer which also is superconductive at the operating temperature with magnetic particles applied thereto. Information is applied to the unit by an electron beam of sufficient strength to modify the magnetic orientation of the particles. Information is read out from said unit by an electron beam of insufficient strength to modify the magnetic orientation of the particles but which will be affected by the magnetic field of said particles. Such modification is reflected in the frequency and intensity of the electromagnetic wave emitted from the three layered unit which can then be read by any convenient frequency discriminating device.

8 Claims, 3 Drawing Figures

INVENTORS
KLAUS DIETER ERBEN
WALTER KROY
SIGMUND MANHART
WALTER E. MEHNERT
BY Woodhams, Blanchard & Flynn
ATTORNEYS

SUPERCONDUCTIVE DEVICE FOR ELECTRONIC STORAGE OF LARGE QUANTITIES OF DATA USING MAGNETIC PARTICLES

The invention relates to a device for electronic storage of large quantities of data, preferably for program or film storage systems.

Various versions of such devices are already known, e.g., memory devices based upon the principle of thermoplastic deformation of a surface layer. These devices have the drawback of relatively high acceptance and charging. Furthermore memory elements with luminescent materials have also been suggested. They also require high access and roll in times.

Another proposed device particularly suited for storing large quantities of data and whose acceptance times have been considerably reduced, utilizes an electron beam system for transferring information to a semiconductor layer applied to a conductor plate. The electron beam system records the information of a charge or conductivity pattern and is controlled by an addressing unit connected in series. Regeneration of the intensity loss of the applied information requires an appropriate device for restoring the information.

The object of the present invention is therefore to provide a memory device which also has a high cell density and high read-out and input speeds, but which permits nondestructive read-out and requires a low addressing and read-out effort. In addition, the information fed in is to be retained even when the electrical supply is switched off.

This objective is accomplished as follows: an insulating film is applied to a substrate which is superconductive at the memory element's operating temperature. Vapor-deposited upon the insulating film is another layer, preferably a Type II superconductor, which is also superconductive at the operating temperature. This upper layer has, at regular intervals, magnetic particles which serve as information carriers.

These features of the invention provide in contrast to presently known memory devices described above an information carrier which retains the information read in without destruction, even after the entire electronic supply has been deenergized. A further development of the invention suggests that the storage element be provided with a single detector system for receiving the information released by the memory positions possibly with a frequency discriminating system, and that the storage element continue to have a single electron gun with a deflection and acceleration system for input and read-out.

The basic unit of the three-layered storage element of the device according to the invention is a Josephson junction. On the superconductive upper layer of this contact, magnetic particles have been vapor-deposited at short regular intervals or in the form of a thin, homogeneous ferro-magnetic layer. In accordance with the invention, the storage element or a memory position is triggered for reading-out or writing-in, preferably by means of a single electron gun with associated deflection and acceleration system. Registration of the information released by the memory position is performed, for all positions by means of a single detector system which may in addition be provided with a frequency discriminating system.

In the following the invention is described and illustrated, so that further advantages and measures can be seen from this and the claims. In the drawing:

Figure 1:
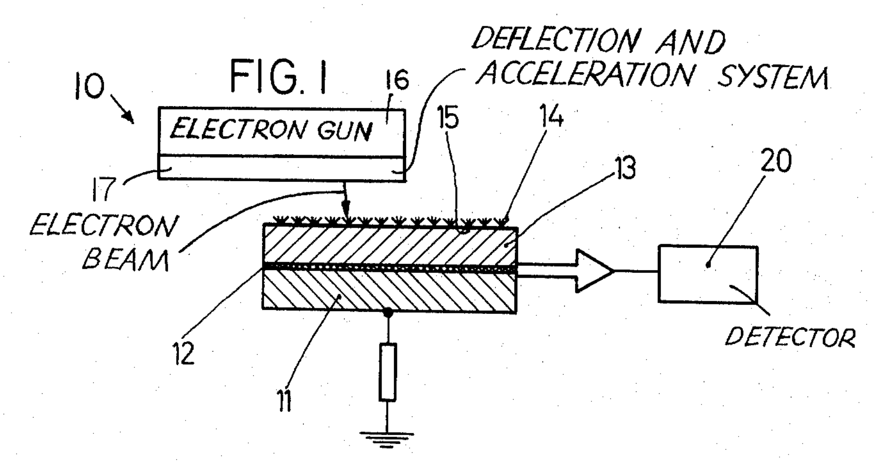
FIG. 1 is a diagram of the storage device

A thin insulating layer 12 is applied to a substrate !! 11 which is superconductive at a favorable temperature, preferably at the boiling point of helium which is 4.2°K. Upon this insulating layer 12, a second layer 13 is vapor-deposited which is superconductive at this temperature and is preferably made from a Type II or III superconducting material. These three layers 11, 12, 13 comprise together a so called Josephson junction which shows characteristic properties when a current flows through it. Thus it is possible, e.g., that for a current up to a certain limiting magnitude $I_{c1}$ to flow through this junction without having a voltage across the junction. This is caused by quantum-mechanical tunneling of electron pairs through the thin insulating layer 12. When this tunneling current reaches the limit $I_{c1}$, a voltage drop occurs across the insulating layer and the net direct current flow is zero. When a magnetic field is applied to a Josephson junction and if the magnitude of the field is varied, the d.c. Josephson effect is observed, i.e., the Josephson current that can be carried by this junction varies periodically as the magnetic field is increased. When this Josephson current oscillates back and forth across the junction, electromagnetic waves are radiated which preferably lie in the microwave region. The power and frequency of these electromagnetic waves are a function of the number and velocity of the electrons flowing through the Josephson junction and of the applied magnetic field itself.

In order to permit storage of information in the Josephson junction, magnetic particles 14 are vapor-deposited on the upper superconductive layer 13 which is preferably a Type II superconductor. For deposition of these magnetic particles, the superconductor layer 13 is placed in a magnetic field, whose strength is between the two critical fields $H_{c1}$ and $H_{C2}$. The density of the memory positions 15 is determined by the spacing between Aprikosov vortices. With appropriate quality and purity of the superconductor, these vortices automatically form a completely regular triangular lattice. When a vacuum is applied, with the superconductor in the magnetic field, an iron or nickel wire is preferably fixed above it and a current is passed through this wire, which makes it incandescent and the wire emits small magnetic particles 14 which are deposited only on the cores 15 of the Aprikosov vortices when the spacing of the wire from the superconductor plate 13 and the magnitude of the heating current are properly selected. At the cores 15 of the Aprikosov vortices the superconductor has normal conductivity, i.e., the orientation parameter disappears. In the other ranges of the superconductor 13, the supercurrents which occur when the magnetic particles 14 approach the superconductive ranges of the conductor, prevent precipitation of the magnetic particles. Thus the magnetic particles can only settle on the cores 15 of the Aprikosov vortices.

Another method for applying the magnetic particles 14 utilizes and electron beam generating a current strength in the superconductor, which is higher than the critical current strength $I_C$. At the point of impact 30 of the beam on the superconductor 13, a normally conducting range is generated, to which magnetic particles 14 are applied in accordance with the procedure described above.

After the magnetic particles 14 have been so applied to a memory position 15, the electron beam is directed to the next required memory position whose distance from the previous one can be arbitrarily chosen as a minimum up to the coherence length of the superconductor 13, and the procedure is repeated until all required memory positions have been generated. This procedure has, as opposed to the one described first, the advantage of eliminating the adjusting efforts for directing the electron beam required for the first procedure. The deflection system for the electron gun, which is used when the lattice is generated in accordance with the second procedure, can with an appropriate design of the memory system and the memory positions generating system, be used as a reading and writing beam after the storage grid has been established.

Figures 2, 3:
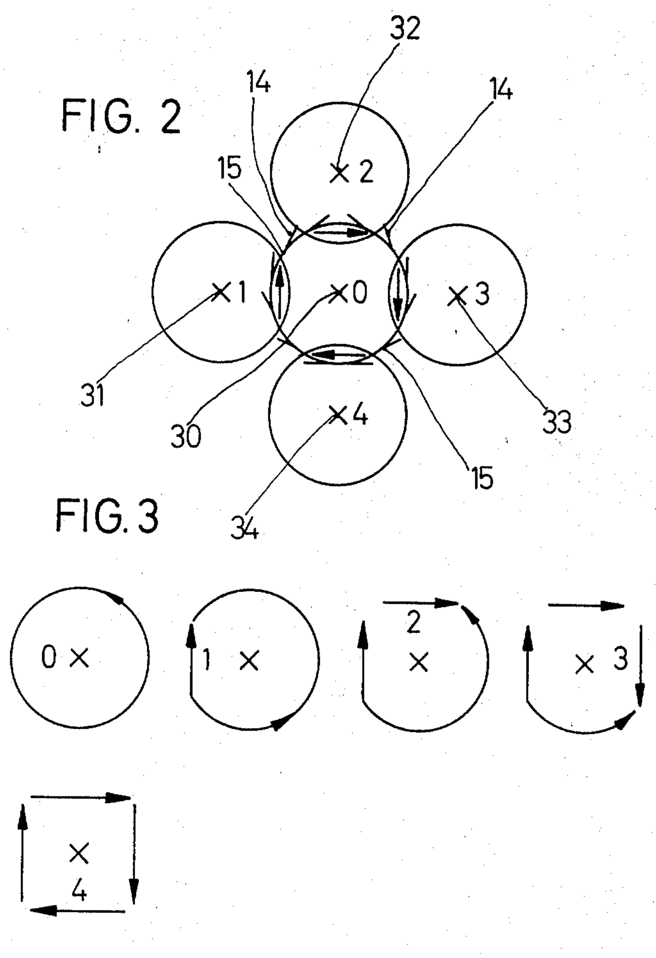
FIG. 2 is a diagram on an enlarged scale of the orientated magnetic particles at the memory positions.
FIG. 3 is an illustrative embodiment of the coding of information 0–4.

The magnetic particles 14 lying on each memory position 15 are orientated by an electron beam producing electron gun 16 which is properly directed by a deflection and acceleration system 17 to the memory position 15 and orients the small permanent magnets with its surrounding magnetic field. The strength of this electron writing beam must be sufficient to permit reorientation of the magnetic particles. By the selection of the point of impact 30 on the superconductor 13 in the middle 0 of the magnetic particles 14, all these magnetic particles 14 are aligned in one direction (fig. 3–0). When the electron beam strikes outside the magnetic particle ring 15, but in the vicinity of it, as shown by Fig. 3 of the drawing, it reorients part of the magnetic particles 14. By selecting several points of impact 31, 32, 33, 34 of the electron beam outside and along the magnetic particle ring 15, and by having the beam strike in the middle 30, several overall orientation magnitudes of the magnetic particle ring 15 are possible, as indicated in Fig. 3. This results, e.g., in the coding for 0, 1, 2, 3 and 4. This orientation is preferably performed by the single electron bema with its associated deflection system. Thus a multiple value storage can be constructed. According to the embodiment described before, five bits can thus be read from one single memory position or magnetic particle 15.

The read-out of the information stored at the memory position is preferably performed by the same electron beam used for generating the memory position and feeding the information into this memory position. For the read-out, the electron beam is, however, operated with such small energy that no reorientation is performed without special measures. When the electron beam strikes the superconductor 13, the magnetic field surrounding the electron beam interacts with the magnetic field generated by the magnetic particles 14, and brakes or accelerates the electrons of the electron beam.

Owing to the nonsymmetrical flux of the magnetic field of the magnetic particles 14, this strikes in the direction of the electron beam. In the field outside the superconductor 13, the magnetic field decays, with the distance from the magnetic particles, with a different function than in the superconductor 13. The thus occurring change of the velocity of the electrons which are converted in the superconductor into superconductive electrons, i.e., from pairs of electrons, controls the current density in the insulating layer 12 of the Josephson contact. Thus, the frequency and intensity of the emitted electromagnetic wave are modified so that the intensity and frequency of this wave enables the contents of the memory position 15, i.e., its orientation of the magnetic particles 14, to be read out. This electromagnetic radiation is radiated from the side of the insulating layer 12 and can be resolved into its various frequencies by a frequency selecting system.

These frequencies and intensities are then distinguished by means of appropriate detectors 20, the information of the memory positions 15 thus becoming available for further use in the electronic system of the computer.

The embodiments of the invention in which an exclusive property or privilege is claimed are defined as follows:

1. In an electronic storage device having first and second superposed superconductive substrates and an insulatory film bonded therebetween, the improvement comprising:

a plurality of magnetically orientable, magnetic memory positions bonded to the outer surface of said first superconductive substrate;

electron gun means disposed adjacent said outer surface and generating an electron beam having first and second levels of energy, said first energy level being adapted to apply information to each of said memory positions by magnetically orienting the magnetic field at said memory position and said second energy level being adapted to generate a read-out signal; and detector means for detecting said read-out signal.

2. An electronic storage device according to claim 1, wherein said plurality of magnetically orientable, magnetic memory positions comprise a plurality of magnetic particles bonded to the outer surface of said first superconductive substrate.

3. An electronic storage device according to claim 2, wherein said magnetic particles are spaced at regular intervals.

4. An electronic storage device according to claim 1, wherein said magnetically orientable, magnetic memory positions are defined by a homogeneous, ferro-magnetic layer bonded to said outer surface of said first superconductive substrate.

5. An electronic storage device according to Claim 1, wherein said first energy level is greater than said second energy level.

6. An electronic storage device according to claim 5, wherein said second energy level is insufficient to disturb the magnetic orientation of each of said memory positions.

7. An electronic storage device according claim 1, wherein said detector means comprises frequency discriminating means.

8. An electronic storage device according to claim 1, wherein said electron gun means consists of a single electron gun having deflection and acceleration means for directing said electron beam to different ones of said memory positions.

* * * * *